(12) United States Patent
Gu (10) Patent No.: US 7,240,969 B2
(45) Date of Patent: Jul. 10, 2007

(54) VEHICLE WHEEL AXLE CENTRIFUGAL ADJUSTING ARRANGEMENT

(75) Inventor: Hong Jiun Gu, P.O. Box 99-141, Taipei (TW)

(73) Assignees: Jar Chen Wang, Cerritos, CA (US); Hong Jiun Gu, Taipei (TW)

( * ) Notice: Subject to any disclaimer, the term of this patent is extended or adjusted under 35 U.S.C. 154(b) by 299 days.

(21) Appl. No.: 10/876,411

(22) Filed: Jun. 25, 2004

(65) Prior Publication Data
US 2006/0012143 A1    Jan. 19, 2006

(51) Int. Cl.
*B60B 19/00*    (2006.01)
(52) U.S. Cl. .................... 301/5.1; 301/110.5; 280/229; 74/571.1
(58) Field of Classification Search ............ 301/1, 301/5.1, 105.1, 110.5; 280/229; 74/571.1, 74/571.11
See application file for complete search history.

(56) References Cited

U.S. PATENT DOCUMENTS

| 605,182 | A | * | 6/1898 | Johnston | .................... | 280/229 |
| 985,369 | A | * | 2/1911 | Robbins | .................... | 280/229 |
| 5,002,295 | A | * | 3/1991 | Lin | .......................... | 280/205 |
| 5,249,847 | A | * | 10/1993 | Lee | ........................ | 301/105.1 |

\* cited by examiner

*Primary Examiner*—Russell D. Stormer
(74) *Attorney, Agent, or Firm*—Raymond Y. Chan; David and Raymond Patent Group (57) ABSTRACT

A vehicle wheel includes a wheel body having an elongated guiding slot radially extended from a center of the wheel body; and an axle centrifugal adjusting arrangement, which includes a sliding member slidably mounted along the guiding slot for mounting the wheel body to the wheel axle; and a gear adjustment device including a first gear unit mounted at the guiding slot of the wheel body, and a second gear unit mounted at the sliding member to substantially engage with the first gear unit so as to selectively adjust the sliding member to slide along the guiding slot.

28 Claims, 9 Drawing Sheets

VEHICLE WHEEL AXLE CENTRIFUGAL ADJUSTING ARRANGEMENT

BACKGROUND OF THE PRESENT INVENTION

1. Field of Invention

The present invention relates to a wheel, and more particularly to a vehicle wheel, such as a bicycle wheel, which is incorporated with a wheel axle centrifugal adjusting arrangement such that a wheel axle of the vehicle can be connected with the wheel in an adjustably movable manner.

2. Description of Related Arts

A conventional vehicle, such as a bicycle or a tricycle, comprises a vehicle frame, a driving unit, such as a mechanical transmission system, supported by the vehicle frame, and at least two wheels each of which rotatably connected to the vehicle frame via a wheel axle which is driven to rotate by the driving unit.

As a matter of fact, for such a conventional vehicle, the wheel axle is usually coaxially connected with the respective vehicle wheel in order to maintain maximum stability of the vehicle while it is moving. Very often however, due to the special applications of a particular vehicle, there may be a need to adjust the relative position of the wheel axle and the vehicle wheel such that the vehicle wheel, while it is driven to rotate, is centrifugally rotating with respect to the wheel axle. Therefore, the vehicle is adapted to achieve a predetermined pattern of movement.

The problem here lies not with the advantages and disadvantages of having the wheel axle coaxially or eccentrically connected to the vehicle wheel. Both connection modes achieve substantially different objectives. The major difficulty lies with the manner in which the vehicle axle connects to the vehicle wheel.

Conventionally, almost all vehicles only allow their wheels either coaxially or centrifugally connecting to the vehicle wheel. Manual adjustment to either mode of the connection is generally unavailable. Accordingly, when a user desires to have both kinds of vehicles, he/she has to buy it one by one without many other options.

Recently, the vehicle has been improved in which the wheel axle is adjustably connected to the vehicle wheel. While such vehicle generally overcomes the above-mentioned difficulty, unfortunately, it creates other problems. For example, the connection between the wheel axle and the vehicle wheel is usually very complicated so that when one is trying to adjust the vehicle wheel from coaxial connection to centrifugal connection or vice versa, some tools must be used and very often, a considerable amount of forces have to be applied for releasing the original connection before the adjustment can be done. After the adjustment, yet considerable amount of forces have to be used again for securing the new connection for keeping subsequent operations of the vehicle safe and stable.

On the other hand, it should be admitted that there are still some vehicles, especially toy vehicles, in which the vehicle wheel is adjustably connected to the respective wheel axle. Since they are inherently toy vehicles, the adjustment is usually become too simple to the extent that even a young child is capable of adjusting the vehicle wheel without any difficulty. In this situation, it may be unsafe to let the child alone with the vehicle because the child may not be able to correctly appreciate the effect of adjusting the position of the wheel axle with respect to the vehicle wheel.

Accordingly, the mechanism of such conventional vehicles is either too complicated or too simple for the user to adjust with respect to the vehicle wheels and the corresponding wheel axle. Thus one can see the difficulty in striking a balance between the complicity and the safety issue, bearing in mind the marketing strategy of the vehicle in question. For example, a too sophisticated mechanism cannot be incorporated into a toy vehicle because it would unduly increase the manufacturing cost and the ultimate selling price of the toy vehicles, thus sharply reducing its competitive edge against competitors in the marketplace.

SUMMARY OF THE PRESENT INVENTION

A main object of the present invention is to provide a vehicle wheel incorporated with a wheel axle centrifugal adjusting arrangement wherein a wheel axle of a vehicle is adapted to connect with the vehicle wheel in an adjustably movable manner. Moreover, after the position of the wheel axle is adjusted, the wheel axle centrifugal adjusting arrangement is capable of retaining the wheel axle for specified operation of the vehicle.

Another object of the present invention is to provide a vehicle wheel incorporated with a wheel axle centrifugal adjusting arrangement which is capable of enabling a wheel axle to be either coaxially or eccentrically connected with the vehicle wheel, subject to a selection and adjustment of a user of the present invention.

Another object of the present invention is to provide a vehicle wheel incorporated with a wheel axle centrifugal adjusting device which is capable of varying the position of the wheel axle with respect to the vehicle wheel without needing to involve any hand tools or equipments, thus minimizing hassles to the user of the present invention.

Another object of the present invention is to provide a vehicle wheel incorporated with a wheel axle centrifugal adjusting device which allows adjustment of a position of the wheel axle with respect to the vehicle wheel for any vehicle wheel having a guiding slot formed thereon.

Another object of the present invention is to provide a vehicle wheel incorporated with a wheel axle centrifugal adjusting device which enhances pleasantness of a user when he/she is traveling with a vehicle, such as a bicycle, incorporated with the vehicle wheel of the present invention.

Another object of the present invention is to provide a vehicle wheel incorporated with a wheel axle centrifugal adjusting device which does not involve complicated or expensive components so as to minimize the manufacturing cost and the ultimate selling price of the present invention.

Another object of the present invention is to provide a vehicle, such as a bicycle, incorporated with a vehicle wheel comprising the wheel axle centrifugal adjusting arrangement such that the vehicle is adapted operate with the vehicle wheel coaxially or eccentrically connecting with the wheel axle.

Accordingly, in order to accomplish the above objects, the present invention provides a vehicle wheel adapted for rotatably mounting to a wheel axle of a vehicle, comprising:

a wheel body having an elongated guiding slot radially extended from a center of the wheel body; and a wheel axle centrifugal adjusting arrangement, comprising:

a sliding member slidably mounted along the guiding slot for mounting the wheel body to the vehicle axle; and a gear adjustment device, comprising a first gear unit mounted at the guiding slot of the wheel body and a second gear unit mounted at the sliding member to substantially engage with the first gear unit so as to selectively adjust the sliding member to slide along the guiding slot, in such a manner that when the sliding member is slid at a position that the vehicle axle is located at the center of the wheel body, the wheel body is concentrically rotated with respect to the vehicle axle, and when the sliding member is slid at a position that the vehicle axle is located offset from the center of the wheel body, the wheel body is eccentrically rotated with respect to the vehicle axle.

These and other objectives, features, and advantages of the present invention will become apparent from the following detailed description, the accompanying drawings, and the appended claims.

DETAILED DESCRIPTION OF THE PREFERRED EMBODIMENT

Figure 10A:
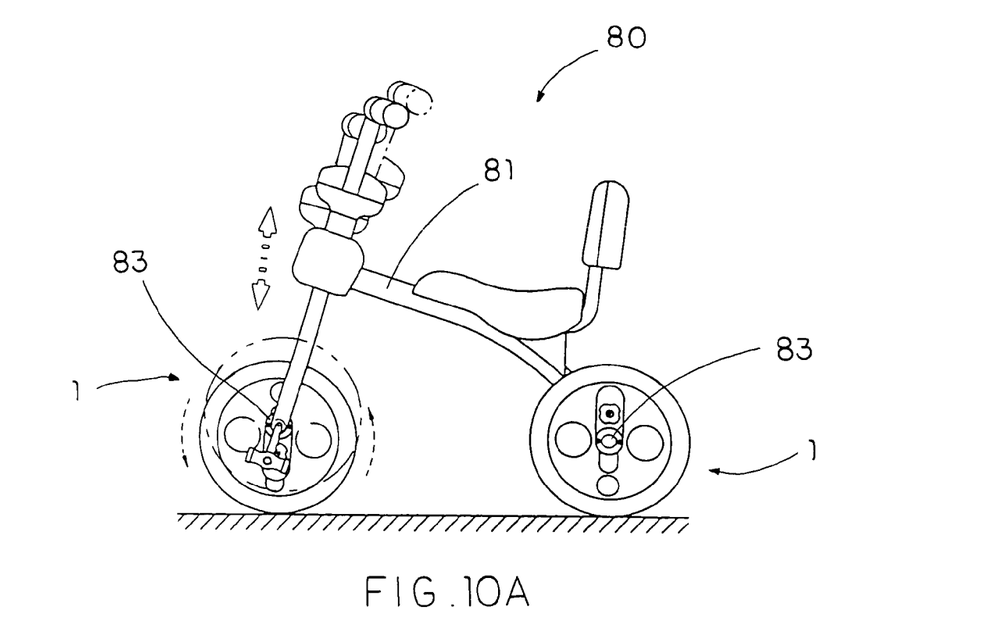
FIG. 10A to FIG. 10C are schematic diagrams of the operation of the wheel axle centrifugal adjusting arrangement according to the above preferred embodiment of the present invention, illustrating that the wheel axle centrifugal adjusting arrangement is installed on a front vehicle wheel, a rear vehicle wheel, and both front and rear vehicle wheels respectively.
Figure 10B:
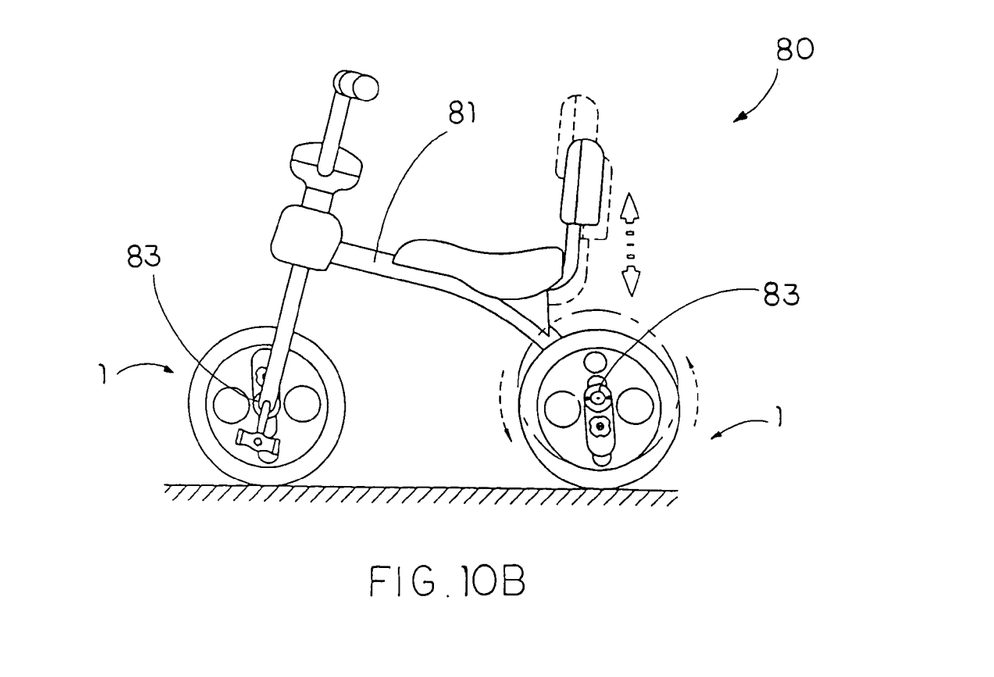
Figure 10C:
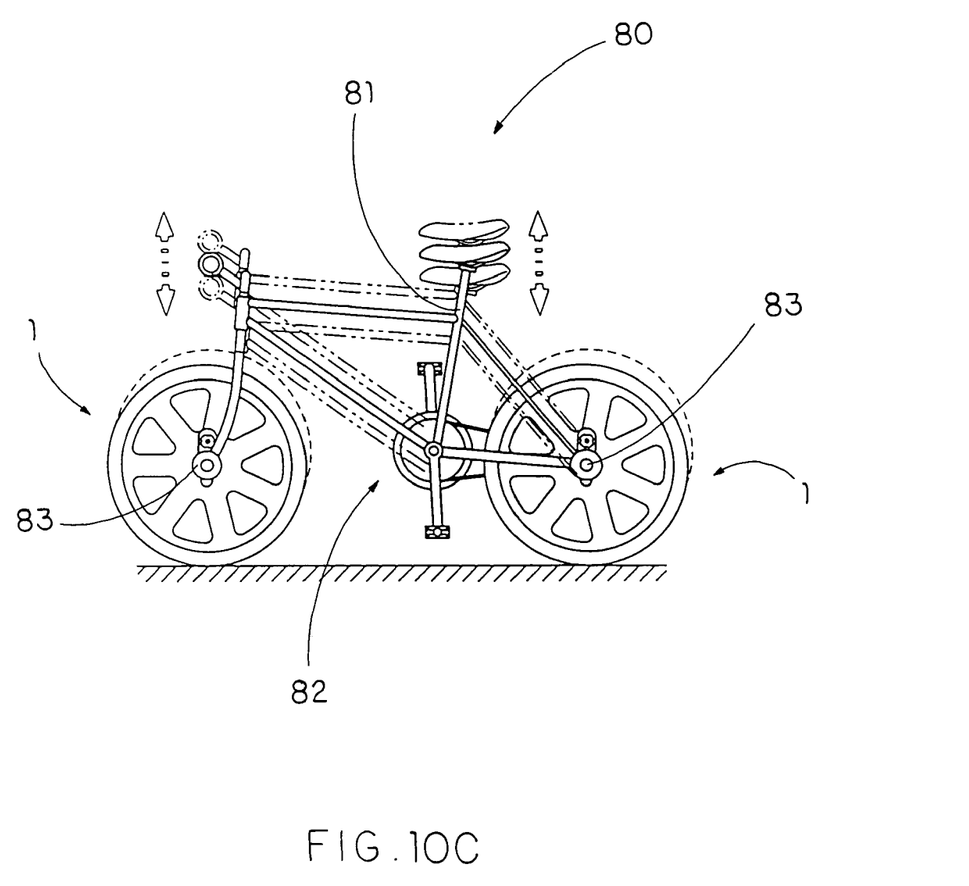

Referring to FIG. 10A to FIG. 10C of the drawings, a typical vehicle 80, such as a bicycle, comprises a vehicle frame 81, at least two vehicle wheels 1 rotatably mounted on the vehicle frame 81 via two wheel axles 83 respectively, and a driving unit 82, such as a regular mechanical transmission unit, mounted on the vehicle frame 81 and operatively connected to the vehicle wheels 1 through the wheel axles 83 for driving the vehicle wheels 1 rotating with respect to the vehicle frame 81.

Figure 1:
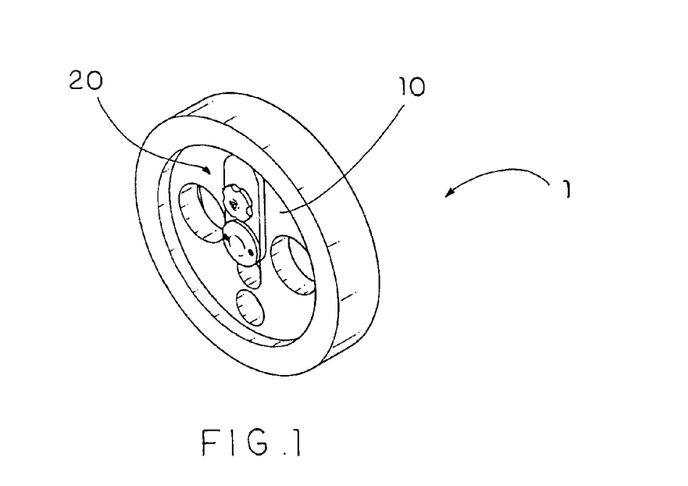
FIG. 1 is a perspective view of a vehicle wheel incorporated with a wheel axle centrifugal adjusting arrangement according to a preferred embodiment of the present invention.
Figure 2:
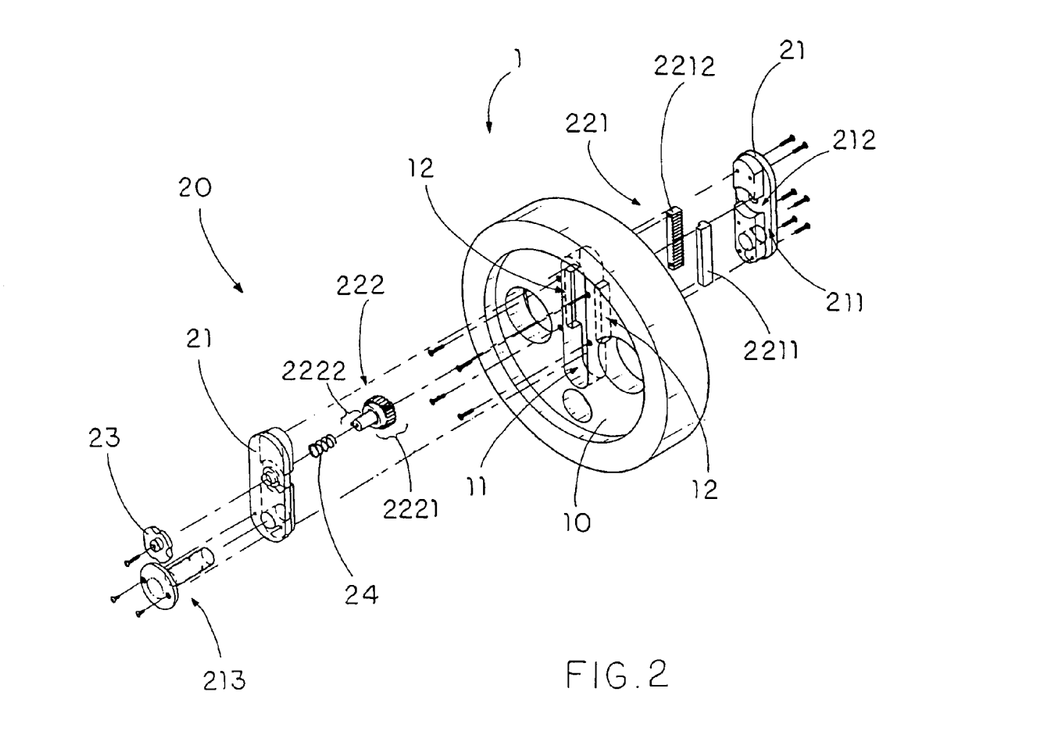
FIG. 2 is an exploded perspective view of the vehicle wheel incorporated with the wheel axle centrifugal adjusting arrangement according to the above preferred embodiment of the present invention.

Referring to FIG. 1 and FIG. 2 of the drawings, a vehicle wheel 1 adapted for rotatably mounting to the wheel axle 83 of the vehicle 80 according to a preferred embodiment of the present invention is illustrated, in which the vehicle wheel 1 comprises a wheel body 10, and a wheel axle centrifugal adjusting arrangement 20.

The wheel body 10 is circular in shape and has an elongated guiding slot 11 formed thereon and radially extended through a center of the circular wheel body 10 in which the wheel axle centrifugal adjusting arrangement 20 is mounted on the guiding slot 11 for adjusting a position of connection between the wheel axle 83 and the wheel body 10.

The wheel axle centrifugal adjusting arrangement 20 comprises a sliding member 21 mounted along the guiding slot 11 in a slidably movable manner, wherein the wheel axle centrifugal adjusting arrangement 20 is adapted for mounting the wheel body 10 to the respective vehicle axle 83.

The wheel axle centrifugal adjusting arrangement 20 further comprises a gear adjustment device comprising a first gear unit 221 mounted at the guiding slot 11 of the wheel body 10, and a second gear unit mounted at the sliding member 21 to substantially engage with the first gear unit 221 50 as to selectively adjust the sliding member 21 to slide along the guiding slot 11, in such a manner that when the sliding member 21 is slid at a position where the vehicle axle 83 is located at a center of the wheel body 10, the wheel body 10 is adapted to concentrically rotate with respect to the vehicle axle 83, and when the sliding member 21 is slid to a position where the vehicle axle 83 is located offset from the center of the wheel body 10, the wheel body 10 is adapted to eccentrically rotate with respect to the vehicle axle 83.

Figure 3:
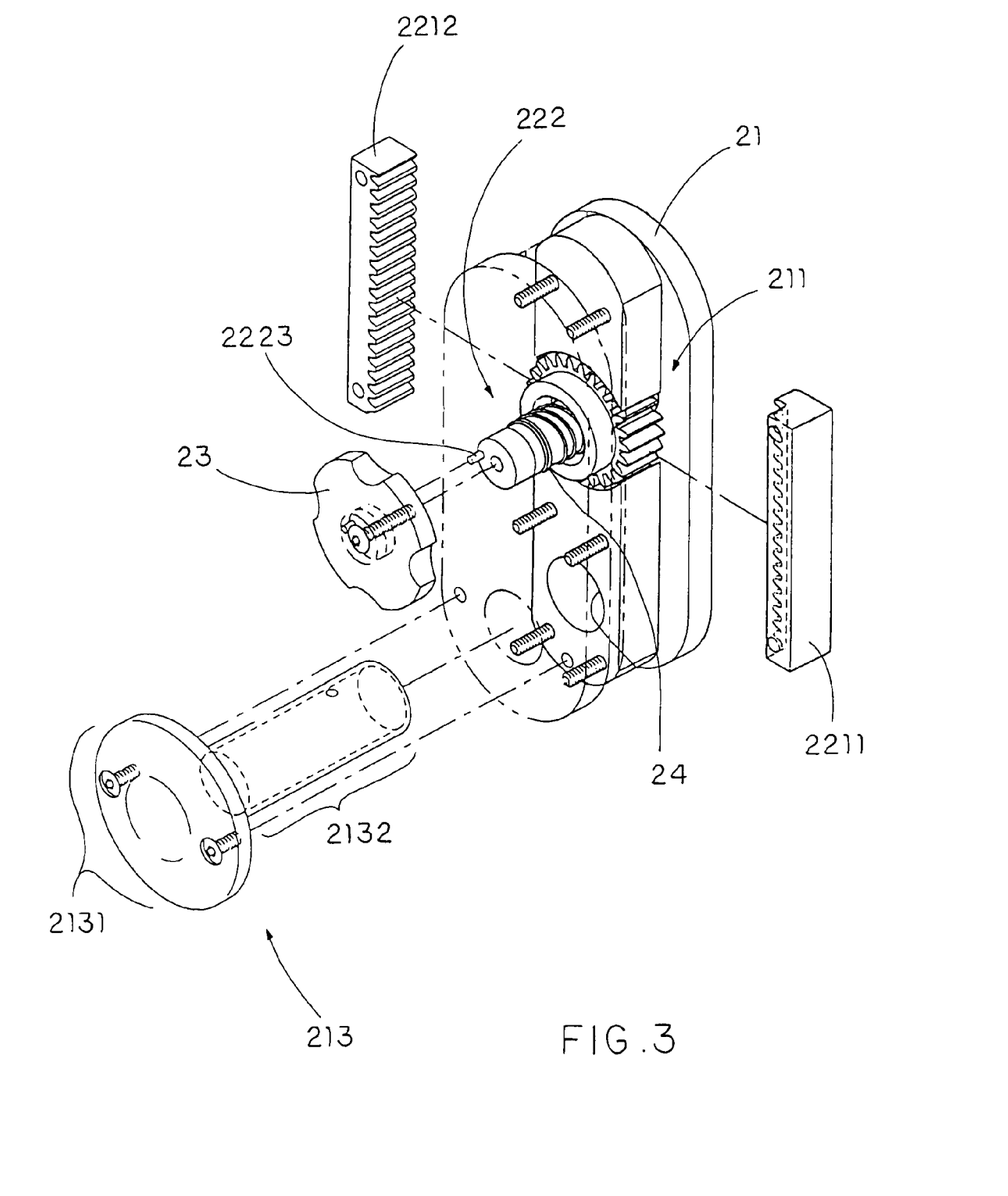
FIG. 3 is an exploded perspective view of the wheel axle centrifugal adjusting arrangement according to the above preferred embodiment of the present invention.

Referring to FIG. 2 to FIG. 3 of the drawings, the second gear unit comprises a rotor gear 222 which is transversely mounted on the sliding member 21 in a slidably moveable manner between a locked position and an unlocked position. On the other hand, the first gear unit 221 comprises a locking wall gear 2211, which is mounted on a first sidewall of the guiding slot 11, having a longitudinal locking gear side defining a longitudinal locking portion and a longitudinal releasing portion extended side by side, in such a manner that when the rotor gear 222 is in the locked position, the rotor gear 222 is arranged to be transversely moved to engage with the locking portion of the locking gear side of the locking wall gear 2211 such that the sliding member 21 is locked up at the guiding slot 11 in position. Conversely, when the rotor gear 222 is in the unlocked position, the rotor gear 222 is transversely moved to the releasing portion of the longitudinal locking gear side of the longitudinal locking wall gear 2211 such that the sliding member 21 is allowed to slide along the guiding slot 11.

Specifically, the rotor gear 222 has a gearing teeth portion 2221 and a shaft portion 2222 extended therefrom, whereas the longitudinal locking portion of the longitudinal locking gear side of the locking wall gear 2211 is embodied as having a plurality of locking teeth evenly formed thereon which is arranged to engage with the gearing teeth portion 2221 of the rotor gear 222 when the rotor gear 222 is in the locked position. On the other hand, the longitudinal releasing portion of the longitudinal locking gear side of the locking wall gear 2211 is embodied as having a flat releasing surface formed thereon, wherein when the rotor gear 222 is in the unlocked position, it is allowed to slide on the flat releasing surface so as to slide the sliding member 21 along said guiding slot 11.

Figure 4:
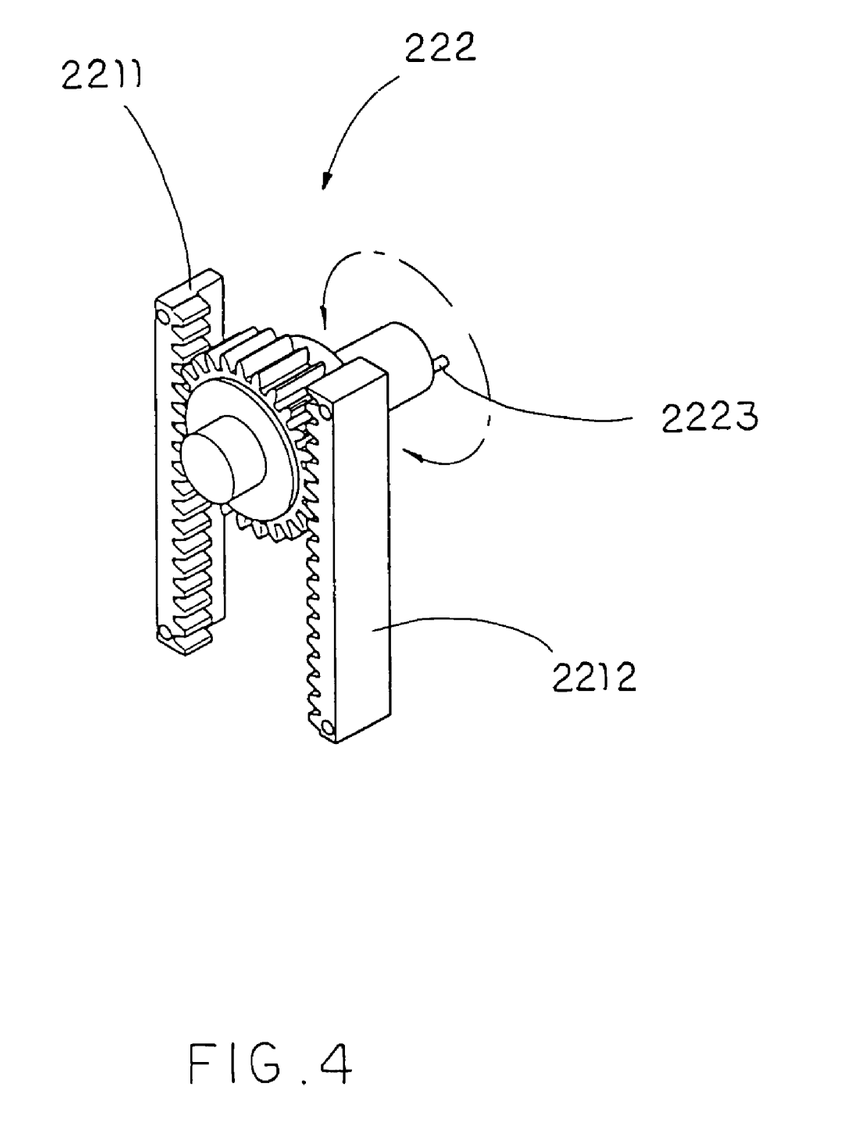
FIG. 4 is a perspective view of the gear adjustment device according to the above preferred embodiment of the present invention.
Figure 5A:
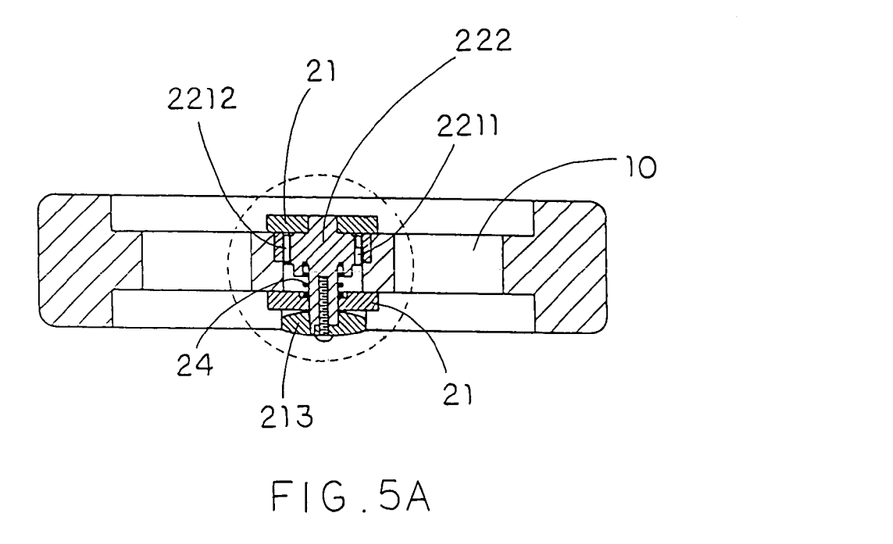
FIG. 5A is a sectional view of the vehicle wheel incorporated with the wheel axle centrifugal adjusting arrangement according to the above preferred embodiment of the present invention, illustrating that the rotor gear is in the locked position.
Figure 5B:
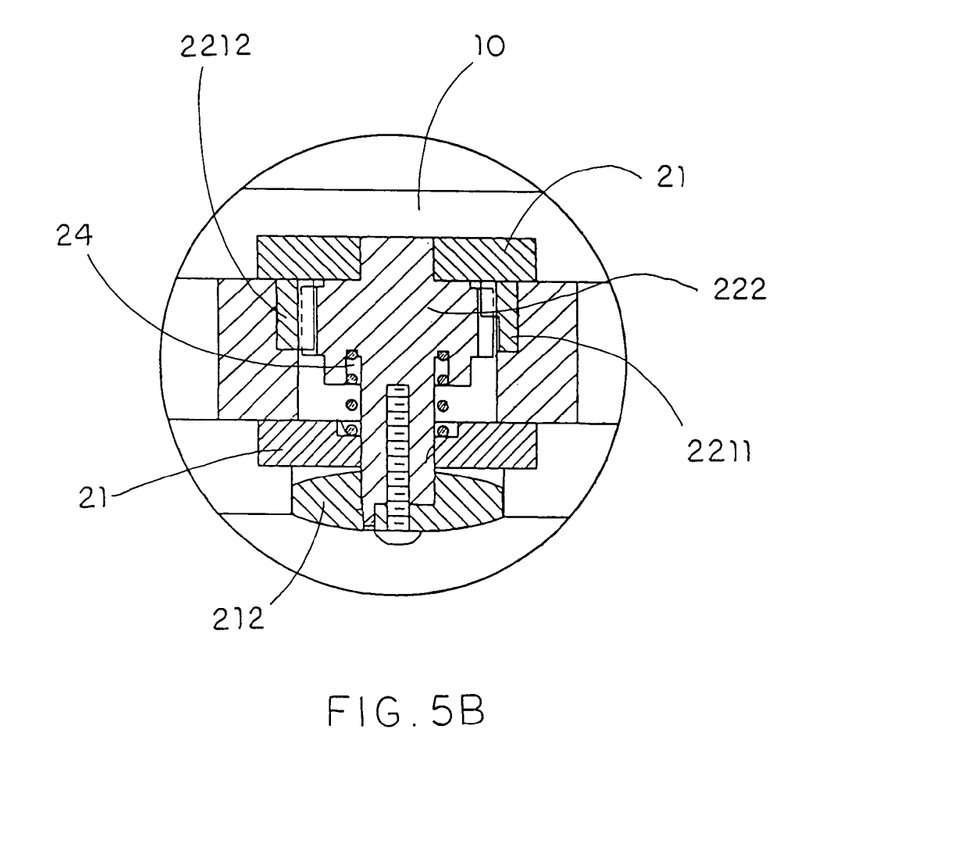
FIG. 5B is a partial sectional view of the vehicle wheel incorporated with the wheel axle centrifugal adjusting arrangement according to the above preferred embodiment of the present invention, illustrating that the rotor gear is in the locked position.
Figure 6A:
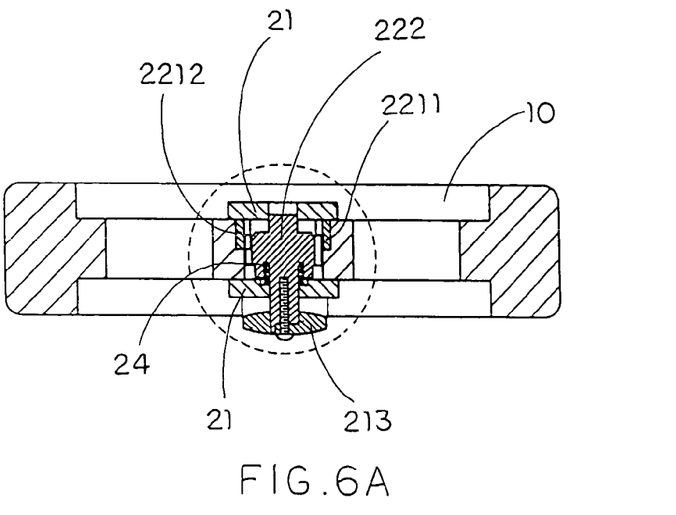
FIG. 6A is a sectional view of the vehicle wheel incorporated with the wheel axle centrifugal adjusting arrangement according to the above preferred embodiment of the present invention, illustrating that the rotor gear is in the unlocked position.
Figure 6B:
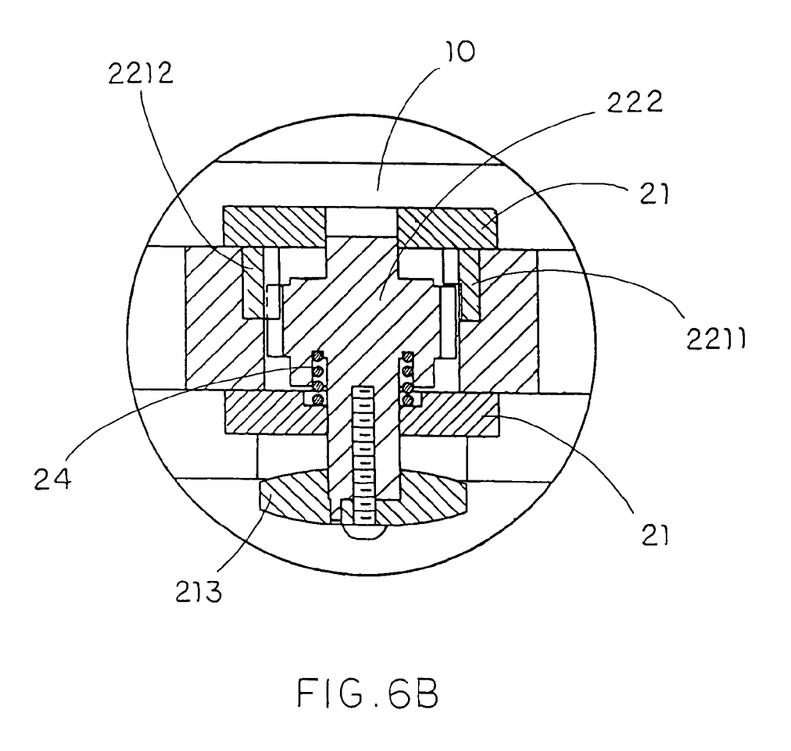
FIG. 6B is a partial sectional view of the vehicle wheel incorporated with the wheel axle centrifugal adjusting arrangement according to the above preferred embodiment of the present invention, illustrating that the rotor gear is in the unlocked position
Figure 7:
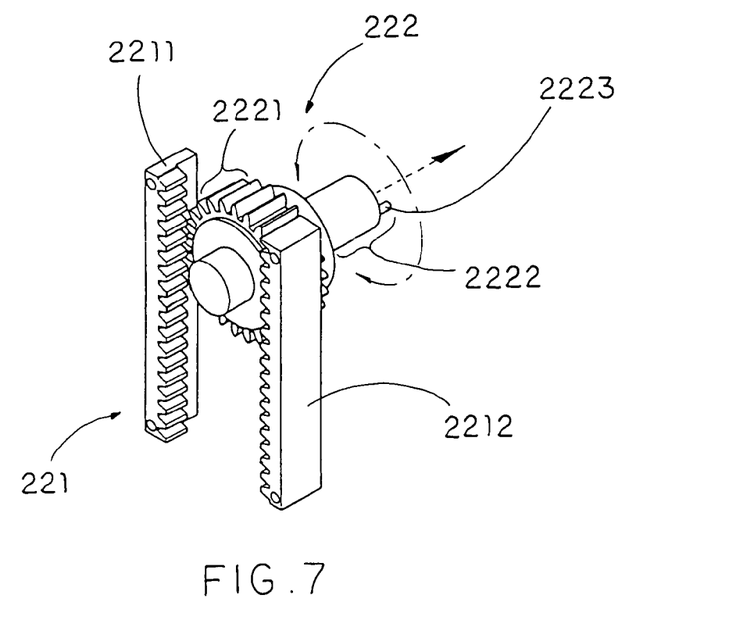
FIG. 7 is a schematic diagram of the gear adjustment device according to the above preferred embodiment of the present invention, illustrating that the relative positions of the first and the second gear unit.

The first gear unit 221 further comprises an engaging wall gear 2212 which is mounted on a second side wall of the guiding slot 11 and has a longitudinal engaging gear side engaging with the rotor gear 222 in such a manner that when the rotor gear 222 is engaged between the longitudinal engaging gear side of the engaging wall gear 2212 and the longitudinal locking portion of the locking wall gear 2211, the rotor gear 222 is securely locked up in position, and when the rotor gear 222 is engaged between the longitudinal engaging gear side of the engaging wall gear 2212 and the longitudinal releasing portion of the locking wall gear 2211, the rotor gear is allowed to rotate to slide the sliding member 21 along said guiding slot 11, as shown in FIG. 4 and FIG. 7 of the drawings. Accordingly, the longitudinal engaging gear side has a plurality of teeth formed thereon for engaging with the gearing teeth portion of the rotor gear 222.

Moreover obviously, the gearing teeth portion of the rotor gear 222 has a plurality of teeth formed thereon for engaging with the longitudinal locking portion of the longitudinal locking gear side of the locking wall gear.

In other words, when the rotor gear 222 is in the unlocked position, the gearing teeth portion of the rotor gear 222 is arranged to communicate with the longitudinal releasing portion of the locking wall gear 2211 and the longitudinal engaging gear side of the engaging wall gear 2212. Since the longitudinal releasing portion is embodied as a flat surface, the rotor gear 222 is thus released from being locked and capable of sliding along the sliding slot 11 by rotatably engaging with the longitudinal engaging gear side of the engaging wall gear 2212. Thus, it means that the rotor gear 222 is adapted to drive, by rotatably engaging with the longitudinal engaging gear side of the engaging wall gear 2212, the sliding member 21 moving along the guiding slot 11 for adjustment of the position of the wheel axle 83 with respect to the wheel body 10.

In other words, a length of the longitudinal engaging wall gear 2212 dictates the extent to which the sliding member 21 is capable of moving along the guiding slot 11. That also means the length of the longitudinal engaging wall gear 2212 reflects the maximum possible displacement which the position of the wheel axle 83 can be adjusted.

Referring to FIG. 2, FIG. 3, FIG. 5A, FIG. 5B, FIG. 6A and FIG. 6B of the drawings, the wheel axle centrifugal adjusting arrangement 20 further comprises an adjustment actuator 23 mounted at the shaft portion 2222 of the gear rotor 222 such that the adjustment actuator 23 is adapted not only to transversely pull the gearing teeth portion 2221 of said gear rotor 222 from the longitudinal locking portion of the locking wall gear 2211 to the longitudinal releasing portion thereof, but also to rotatably drive the gearing teeth portion 2221 of the gear rotor 222 along the engaging wall gear 2212 to adjust the sliding member 21 along said guiding slot 11.

The wheel axle centrifugal adjusting arrangement 20 further comprises a resilient element 24, which is embodied as a regular compressive spring, disposed within the gear cavity for applying an urging force against the rotor gear 222 so as to transversely push the rotor gear 222 within the gear cavity to normally engage with the longitudinal locking portion of the locking wall gear 2211. In other words, the resilient element 24 is arranged to normally push for retaining the rotor gear 222 in the locked position.

According to the preferred embodiment of the present invention, the resilient element 24 is arranged to be coaxially mounted to the shaft portion of the rotor gear 222 so as to substantially push the gearing teeth portion of the rotor gear 222 to engage with the longitudinal locking portion of said locking wall gear 2211.

Figure 8:
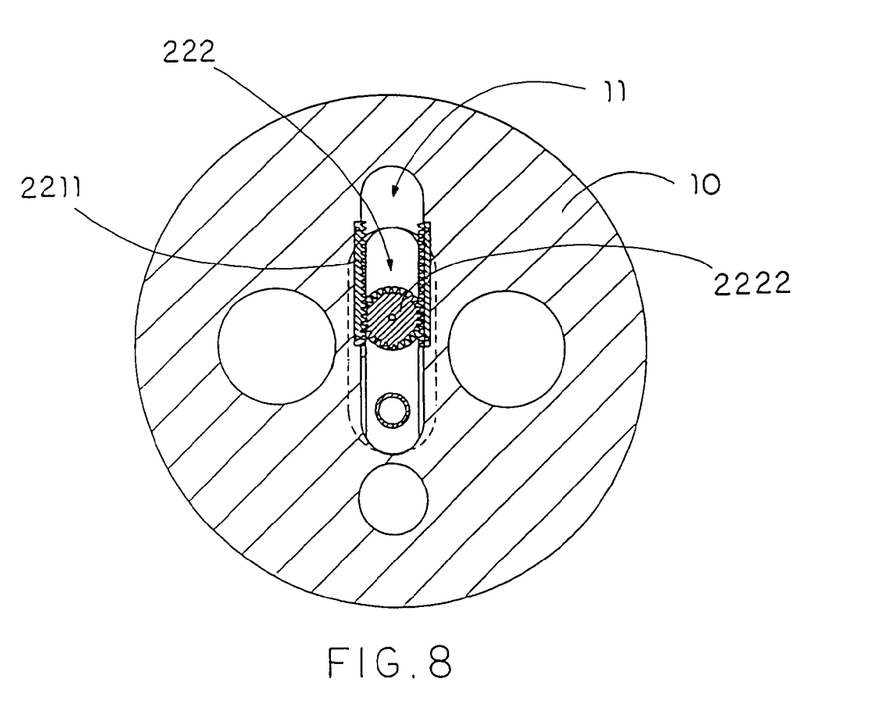
FIG. 8 is a sectional side view of the gear adjustment device according to the above preferred embodiment of the present invention, illustrating a possible operation of the gear adjustment device.

As a result, a user may manually pull the adjustment actuator 23 outwardly from the sliding member 21 for moving the rotor gear 222 from the locked position to the unlocked position. Once the rotor gear 222 is moved to the unlocked position, by rotating the rotor gear 222 via rotating the adjustment actuator 23, the rotor gear 222 is arranged to slidably move along the longitudinal engaging gear side of the longitudinal engaging wall gear 2212 and the longitudinal release portion of the longitudinal locking gear side of the longitudinal locking wall gear 2211. Illustrating diagrams are shown in FIG. 7 and FIG. 8 of the drawings.

Referring to FIG. 3 of the drawings, the rotor gear 222 further has a securing pin 2223 outwardly and eccentrically protruded from the shaft portion of the rotor gear 222 and adapted to insert into a centrifugal connecting slot which is provided on the adjustment actuator 23 in order for the rotor gear 222 to be coupled with the adjustment actuator 23.

Alternatively, the adjustment actuator 23 can be embodied as detachably coupling with the rotor gear 222 such that the user of the present invention is capable of selectively adjust the position of the wheel axle 83 with respect to the vehicle wheel 1. Moreover, this feature can also prevent unwanted adjustment by such persons as children in that the wheel axle 83 can only be adjusted by utilizing the adjustment actuator 23 for moving the rotor gear 222 from the locked position to the unlocked position.

Referring to FIG. 2 of the drawings, the wheel body 10 further has a pair of receiving slots 12 indently and longitudinally formed on two sidewalls of the sliding slot 11 respectively wherein the locking wall gear 2211 and the engaging wall gear 2212 are securely mounted in the two receiving slots 12 respectively for engaging with the rotor gear 222 which is adapted to move between the locked position and the unlocked position.

Referring to FIG. 2 to FIG. 3 of the drawings, the sliding member 21 further has two side slots 211 defined as two side portions thereof for engaging with the first and the second sidewalls of the guiding slot 11 so as to ensure and guide the sliding movement of the sliding member 21 with respect to the guiding slot 11. Moreover, the two side slots 211, by engaging with the two sidewalls of the guiding slot 11, substantially restrict a sideward movement of the sliding member 21 with respect to the wheel body 10.

Furthermore, the sliding member 21 further has a gear cavity 212 formed therein to rotatably receive the rotor gear 222 which is capable of moving between the locked position and the unlocked position, and comprises a shaft attachment member 213 transversely extended in the guiding slot 11 for connecting with the wheel axle 83 so as to rotatably mount the wheel body 10 to the wheel axle 83.

Figure 9:
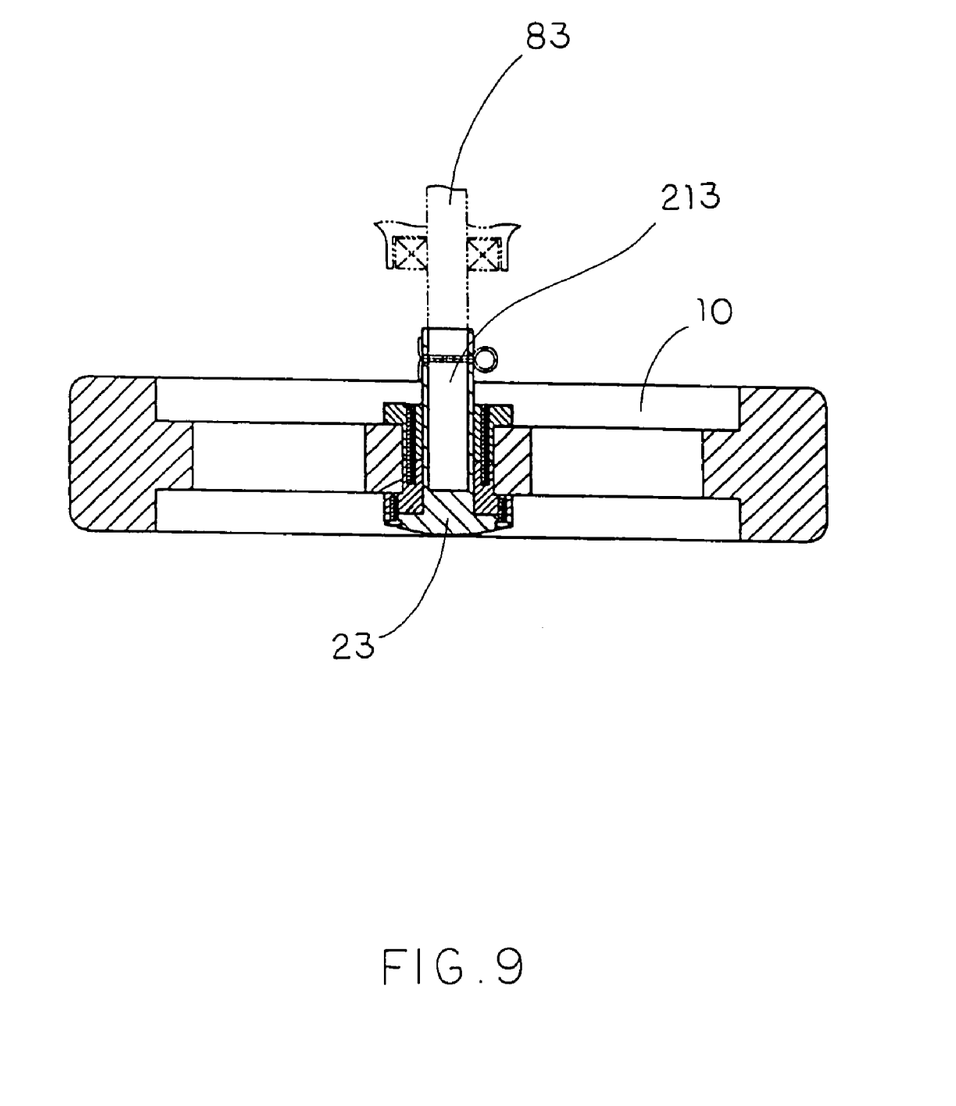
FIG. 9 is a sectional side view of the wheel axle centrifugal adjusting arrangement according to the above preferred embodiment of the present invention, illustrating that the shaft attachment member is rotatably connected to the wheel axle.

Referring to FIG. 3 and FIG. 9 of the drawings, according to the preferred embodiment, the shaft attachment member 213 has a tubular shaft connecting portion 2131 and a stopper cap portion 2132 wherein the wheel axle 83 is rotatably connected with the tubular shaft connecting portion 2131 at an inner side of the wheel body 10 and transversely extended through the guiding slot 11 towards an outer side of the wheel body 10 where the stopper cap portion 2132 is provided. Thus, a transverse lateral movement between the wheel axle 83 and the wheel body is restricted by the stopper cap portion 2132 while it is rotatably connected with the wheel body 10 through the tubular shaft connecting portion 2131 of the shaft attachment member 213.

In order to fit the maximum variety of circumstances which may present, the shaft attachment member 213 may be embodied as having a through shaft connecting channel formed thereon wherein the wheel axle 83 is adapted to rotatably connected to the wheel body 10 by passing through the shaft connecting channel.

Referring to FIG. 2 of the drawings, according to the preferred embodiment of the present invention, the sliding member 21 is embodied as comprising a first and a second sliders slidably mounted on a front and a rear side of the wheel body 10 to form the side slots 211 and the gear cavity 212 wherein the first and the second sliders is connected with each other in the guiding slot 11 to form the sliding member 21.

The operation of the wheel axle centrifugal adjusting arrangement 20 is as follows: when a user of the present invention desires to adjust the position of the wheel axle 83 with respect to the wheel body 10, he/she simply needs to slightly pull from the wheel body 10 the adjustment actuator 23 so as to drive the rotor gear 222 from the locked position to the unlocked position. Then, he/she should rotate the adjustment actuator 23 so as to rotatably drive the rotor gear 222 sliding along first gear unit 221 the guiding slot. Since the wheel axle 83 is rotatably connected with the sliding member 21, thus, a sliding movement of the sliding member 21 would ultimately alter the position of the wheel axle with respect to the wheel body on which the sliding member 21 is slidably mounted. Hence, the direction of sliding would depend upon the direction of rotation. This also means the user is capable of adjusting the position of the wheel axle 83 with respect to the wheel body 20.

After adjustment is completed, the user simply needs to release the pulling force. Due to the normal retaining force exerted by the resilient element 24 to the rotor gear 222 as disclosed above, it will then be driven by the resilient element 24 back to the locked position.

One skilled in the art would appreciate that the vehicle wheel 1, after adjustment, is capable of either rotating coaxially with the wheel axle 83 or rotating eccentrically with respect to the wheel axle 83, as freely decided by the user of the present invention.

FIG. 10A to FIG. 10C of the drawings illustrate three possible operations of the present invention. Referring to FIG. 10A of the drawings, a front vehicle wheel 1 of the vehicle 80 is incorporated with the wheel axle centrifugal adjusting arrangement 20 so that when the vehicle 80 is moving, a front portion of the which is arranged to displace up and down for enhance pleasure.

Referring to FIG. 10B of the drawings, the wheel axle centrifugal adjusting arrangement 20 is incorporated with the rear wheel of the vehicle 80 so that a rear portion of the vehicle 80 is adapted to displace up and down while it is moving. FIG. 10C illustrates that the both the rear and the front wheels are equipped with the wheel axle centrifugal adjusting arrangement 20 so that continuous up and down displacement of the vehicle 80 can be observed while it is moving.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A vehicle wheel adapted for rotatably mounting to a wheel axle of a vehicle, comprising:

a wheel body having an elongated guiding slot radially extended from a center of said wheel body; and an axle centrifugal adjusting arrangement; comprising:

a sliding member slidably mounted along said guiding slot for rotatably mounting said wheel body to said wheel axle; and a gear adjustment device, comprising a first gear unit mounted at said guiding slot of said wheel body and a second gear unit mounted at said sliding member to substantially engage with said first gear unit so as to selectively adjust said sliding member to slide along said guiding slot, in such a manner that when said sliding member is slid at a position that said wheel axle is located at said center of said wheel body, said wheel body is concentrically rotated with respect to said wheel axle, and when said sliding member is slid at a position that said wheel axle is located offset from said center of said wheel body, said wheel body is eccentrically rotated with respect to said wheel axle, wherein said first gear unit comprises a locking wall gear which is mounted on a first sidewall of said guiding slot and has a longitudinal locking gear side defining a longitudinal locking portion and a longitudinal releasing portion extended side by side, wherein said second gear unit comprises a rotor gear transversely and slidably mounted on said sliding member between a locked position and an unlocked position, wherein at said locking position, said rotor gear is transversely moved to engage with said longitudinal locking portion of said longitudinal locking gear side of said locking wall gear such that said sliding member is locked up at said guiding slot in position, and at said unlocked position, said rotor gear is transversely moved to said releasing portion of said longitudinal locking gear side of said longitudinal locking wall gear such that said sliding member is allowed to slide along said guiding slot.

2. The vehicle wheel, as recited in claim 1, wherein said locking wall gear has a plurality of locking teeth evenly formed on said longitudinal locking portion of said longitudinal locking gear side and a flat releasing surface formed on said longitudinal releasing portion of longitudinal locking gear side such that when said rotor gear is transversely moved to substantially engage with said locking teeth, said rotor gear is locked up in position, and when said rotor gear is transversely moved at the flat releasing surface, said rotor gear is allowed to slide on said flat releasing surface so as to slide said sliding member along said guiding slot.

3. The vehicle wheel, as recited in claim 2, wherein said first gear unit further comprises an engaging wall gear which is mounted on a second sidewall of said guiding slot and has a longitudinal engaging gear side engaging with said rotor gear in such a manner that when said rotor gear is engaged between said longitudinal engaging gear side of said engaging wall gear and said longitudinal locking portion of said locking wall gear, said rotor gear is securely locked up in position, and when said rotor gear is engaged between said longitudinal engaging gear side of said engaging wall gear and said longitudinal releasing portion of said locking wall gear, said rotor gear is allowed to rotate to slide said sliding member along said guiding slot.

4. The vehicle wheel, as recited in claim 3, wherein said sliding member has a transverse gear cavity to rotatably and slidably receive said rotor gear, wherein said wheel axle centrifugal adjusting arrangement further comprises a resilient element disposed within said gear cavity for applying an urging force against said rotor gear so as to transversely push said rotor gear within said gear cavity to normally engage with said longitudinal locking portion of said locking wall gear.

5. The vehicle wheel, as recited in claim 4, wherein said sliding member further has two side slots slidably engaging with said first and said second sidewalls of said guiding slot respectively so as to ensure and guide said sliding member to slide along said guiding slot.

6. The vehicle wheel, as recited in claim 4, wherein said wheel body further has two receiving slots indently and longitudinally formed on said first and second sidewalls of said guiding slot respectively, wherein said locking wall gear and said engaging wall gear are securely mounted within said receiving slots respectively to engage with said rotor gear.

7. The vehicle wheel, as recited in claim 3, wherein said rotor gear has a shaft portion and a gearing teeth portion to substantially engage with said longitudinal engaging gear side of said engaging wall gear and to selectively engage between said longitudinal releasing portion of said locking wall gear and said longitudinal locking portion thereof, wherein said resilient element comprises a compression spring coaxially mounted to said shaft portion of said rotor gear so as to substantially push said gearing teeth portion of said rotor gear to engage with said longitudinal locking portion of said locking wall gear.

8. The vehicle wheel, as recited in claim 7, said wheel axle centrifugal adjusting arrangement further comprises an adjustment actuator detachably mounted at said shaft portion of said gear rotor such that said adjustment actuator is adapted not only to transversely pull said gearing teeth portion of said gear rotor from said longitudinal locking portion of said locking wall gear to said longitudinal releasing portion thereof but also to rotatably drive said gearing teeth portion of said gear rotor along said engaging wall gear to adjust said sliding member along said guiding slot.

9. The vehicle wheel, as recited in claim 8, wherein said sliding member further has two side slots slidably engaging with said first and said second sidewalls of said guiding slot respectively so as to ensure and guide said sliding member to slide along said guiding slot.

10. The vehicle wheel, as recited in claim 9, wherein said wheel body further has two receiving slots indently and longitudinally formed on said first and second sidewalls of said guiding slot respectively, wherein said locking wall gear and said engaging wall gear are securely mounted within said receiving slots respectively to engage with said rotor gear.

11. The vehicle wheel, as recited in claim 10, wherein said sliding member comprises a shaft attachment member transversely extended for rotatably connecting with said wheel axle so as to rotatably mount said wheel body to said vehicle.

12. The vehicle wheel, as recited in claim 9, wherein said sliding member comprises a shaft attachment member transversely extended for rotatably connecting with said wheel axle so as to rotatably mount said wheel body to said vehicle.

13. The vehicle wheel, as recited in claim 1, wherein said first gear unit further comprises an engaging wall gear which is mounted on a second sidewall of said guiding slot and has a longitudinal engaging gear side engaging with said rotor gear in such a manner that when said rotor gear is engaged between said longitudinal engaging gear side of said engaging wall gear and said longitudinal locking portion of said locking wall gear, said rotor gear is securely locked up in position, and when said rotor gear is engaged between said longitudinal engaging gear side of said engaging wall gear and said longitudinal releasing portion of said locking wall gear, said rotor gear is allowed to rotate to slide said sliding member along said guiding slot.

14. The vehicle wheel, as recited in claim 13, wherein said sliding member has a transverse gear cavity to rotatably and slidably receive said rotor gear, wherein said wheel axle centrifugal adjusting arrangement further comprises a resilient element disposed within said gear cavity for applying an urging force against said rotor gear so as to transversely push said rotor gear within said gear cavity to normally engage with said longitudinal locking portion of said locking wall gear.

15. The vehicle wheel, as recited in claim 13, wherein said rotor gear has a shaft portion and a gearing teeth portion to substantially engage with said longitudinal engaging gear side of said engaging wall gear and to selectively engage between said longitudinal releasing portion of said locking wall gear and said longitudinal locking portion thereof, wherein said resilient element comprises a compression spring coaxially mounted to said shaft portion of said rotor gear so as to substantially push said gearing teeth portion of said rotor gear to engage with said longitudinal locking portion of said locking wall gear.

16. The vehicle wheel, as recited in claim 15, said wheel axle centrifugal adjusting arrangement further comprises an adjustment actuator detachably mounted at said shaft portion of said gear rotor such that said adjustment actuator is adapted not only to transversely pull said gearing teeth portion of said gear rotor from said longitudinal locking portion of said locking wall gear to said longitudinal releasing portion thereof but also to rotatably drive said gearing teeth portion of said gear rotor along said engaging wall gear to adjust said sliding member along said guiding slot.

17. The vehicle wheel, as recited in claim 13, wherein said sliding member further has two side slots slidably engaging with said first and said second sidewalls of said guiding slot respectively so as to ensure and guide said sliding member to slide along said guiding slot.

18. The vehicle wheel, as recited in claim 13, wherein said wheel body further has two receiving slots indently and longitudinally formed on said first and second sidewalls of said guiding slot respectively, wherein said locking wall gear and said engaging wall gear are securely mounted within said receiving slots respectively to engage with said rotor gear.

19. A vehicle, comprising:

a vehicle frame comprising at least two wheel axles;

at least two vehicle wheels, wherein each of said vehicle wheels comprises:

a wheel body having an elongated guiding slot radially extended from a center of said wheel body; and an axle centrifugal adjusting arrangement, comprising:

a sliding member slidably mounted along said guiding slot to rotatably mount said wheel body to said respective wheel axle; and a gear adjustment device, comprising a first gear unit mounted at said guiding slot of said wheel body and a second gear unit mounted at said sliding member to substantially engage with said first gear unit so as to selectively adjust said sliding member to slide along said guiding slot, in such a manner that when said sliding member is slid at a position that said wheel axle is located at said center of said wheel body, said wheel body is concentrically rotated with respect to said respective wheel axle, and when said sliding member is slid at a position that said respective wheel axle is located offset from said center of said wheel body, said wheel body is eccentrically rotated with respect to said respective wheel axle; and a driving unit operatively mounted on said vehicle frame to drive one of said vehicle wheels to rotate through said respective wheel axle, wherein said first gear unit comprises a locking wall gear which is mounted on a first sidewall of said guiding slot and has a longitudinal locking gear side defining a longitudinal locking portion and a longitudinal releasing portion extended side by side, wherein said second gear unit comprises a rotor gear transversely and slidably mounted on said sliding member between a locked position and an unlocked position, wherein at said locking position, said rotor gear is transversely moved to engage with said longitudinal locking portion of said longitudinal locking gear side of said locking wall gear such that said sliding member is locked up at said guiding slot in position, and at said unlocked position, said rotor gear is transversely moved to with said releasing portion of said longitudinal locking gear side of said longitudinal locking wall gear such that said sliding member is allowed to slide along said guiding slot.

20. The vehicle, as recited in claim 19, wherein said locking wall gear has a plurality of locking teeth evenly formed on said longitudinal locking portion of said longitudinal locking gear side and a flat releasing surface formed on said longitudinal releasing portion of longitudinal locking gear side such that when said rotor gear is transversely moved to substantially engage with said locking teeth, said rotor gear is locked up in position, and when said rotor gear is transversely moved at the flat releasing surface, said rotor gear is allowed to slide on said flat releasing surface so as to slide said sliding member along said guiding slot.

21. The vehicle wheel, as recited in claim 20, wherein said first gear unit further comprises an engaging wall gear which is mounted on a second sidewall of said guiding slot and has a longitudinal engaging gear side engaging with said rotor gear in such a manner that when said rotor gear is engaged between said longitudinal engaging gear side of said engaging wall gear and said longitudinal locking portion of said locking wall gear, said rotor gear is securely locked up in position, and when said rotor gear is engaged between said longitudinal engaging gear side of said engaging wall gear and said longitudinal releasing portion of said locking wall gear, said rotor gear is allowed to rotate to slide said sliding member along said guiding slot.

22. The vehicle wheel, as recited in claim 21, wherein said sliding member has a transverse gear cavity to rotatably and slidably receive said rotor gear, wherein said wheel axle centrifugal adjusting arrangement further comprises a resilient element disposed within said gear cavity for applying an urging force against said rotor gear so as to transversely push said rotor gear within said gear cavity to normally engage with said longitudinal locking portion of said locking wall gear.

23. The vehicle wheel, as recited in claim 22, wherein said sliding member further has two side slots slidably engaging with said first and said second sidewalls of said guiding slot respectively so as to ensure and guide said sliding member to slide along said guiding slot.

24. The vehicle wheel, as recited in claim 23, wherein said wheel body further has two receiving slots indently and longitudinally formed on said first and second sidewalls of said guiding slot respectively, wherein said locking wall gear and said engaging wall gear are securely mounted within said receiving slots respectively to engage with said rotor gear.

25. The vehicle wheel, as recited in claim 19, wherein said first gear unit further comprises an engaging wall gear which is mounted on a second sidewall of said guiding slot and has a longitudinal engaging gear side engaging with said rotor gear in such a manner that when said rotor gear is engaged between said longitudinal engaging gear side of said engaging wall gear and said longitudinal locking portion of said locking wall gear, said rotor gear is securely locked up in position, and when said rotor gear is engaged between said longitudinal engaging gear side of said engaging wall gear and said longitudinal releasing portion of said locking wall gear, said rotor gear is allowed to rotate to slide said sliding member along said guiding slot.

26. The vehicle wheel, as recited in claim 25, wherein said sliding member has a transverse gear cavity to rotatably and slidably receive said rotor gear, wherein said wheel axle centrifugal adjusting arrangement further comprises a resilient element disposed within said gear cavity for applying an urging force against said rotor gear so as to transversely push said rotor gear within said gear cavity to normally engage with said longitudinal locking portion of said locking wall gear.

27. The vehicle wheel, as recited in claim 25, wherein said sliding member further has two side slots slidably engaging with said first and said second sidewalls of said guiding slot respectively so as to ensure and guide said sliding member to slide along said guiding slot.

28. The vehicle wheel, as recited in claim 25, wherein said wheel body further has two receiving slots indently and longitudinally formed on said first and second sidewalls of said guiding slot respectively, wherein said locking wall gear and said engaging wall gear are securely mounted within said receiving slots respectively to engage with said rotor gear.

* * * * *